United States Patent
Stahl et al.

(10) Patent No.: US 6,763,297 B1
(45) Date of Patent: Jul. 13, 2004

(54) DISPLACEMENT ON DEMAND SPARK KNOCK DETECTION

(75) Inventors: Ian G. Stahl, Royal Oak, MI (US); Alfred E. Spitza, Jr., Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/460,887

(22) Filed: Jun. 13, 2003

(51) Int. Cl.$^7$ ................................ F02P 5/152
(52) U.S. Cl. .............. 701/111; 701/114; 123/406.26; 123/198 DB
(58) Field of Search .................. 701/110, 114, 701/111, 115, 102; 123/198 DB, 406.26, 406.29, 406.35; 73/116, 117.3

(56) References Cited

U.S. PATENT DOCUMENTS

| | | | | | |
|---|---|---|---|---|---|
| 5,287,837 A | * | 2/1994 | Hashimoto et al. | ..... | 123/406.29 |
| 5,645,034 A | * | 7/1997 | Entenmann et al. | ..... | 123/406.33 |
| 6,000,276 A | * | 12/1999 | Mogi et al. | ................ | 73/35.08 |
| 6,662,781 B1 | * | 12/2003 | Torno et al. | ........... | 123/406.21 |

* cited by examiner

*Primary Examiner*—Hieu T. Vo
(74) *Attorney, Agent, or Firm*—Christopher DeVries

(57) ABSTRACT

False spark knock detection is minimized for a displacement on demand engine having activated and deactivated modes. The engine is operated in the activated mode. Knock detection is performed on all cylinders of the engine during the activated mode. The engine is operated in the deactivated mode. Knock detection is performed on activated cylinders during the deactivated mode. Knock detection is disabled for deactivated cylinders during the deactivated mode.

15 Claims, 6 Drawing Sheets

DISPLACEMENT ON DEMAND SPARK KNOCK DETECTION

FIELD OF THE INVENTION

The present invention relates to displacement on demand engines, and more particularly to a control system for detecting spark during displacement on demand transitions.

BACKGROUND OF THE INVENTION

Displacement on Demand (DOD) engines deactivate one or more cylinders when full engine power is not needed. Running on fewer cylinders reduces pumping losses and improves fuel economy. An engine control system transitions from a deactivated mode to an activated mode when full power is required or for stability as the engine nears idle.

Spark knock is caused by auto-ignition of a fuel/air mixture in the cylinders. High pressure waves propagate and cause an audible "knocking" sound. Audible spark knock causes customer dissatisfaction and can lead to engine damage. Some engine control systems detect spark knock and vary spark advance to reduce spark knock. A knock sensor monitors a knock frequency in each cylinder during part of the power stroke.

The output of the knock sensors provides an instantaneous noise value (INST). Knock occurs when the instantaneous noise value exceeds a knock threshold (TH). The difference between the instantaneous noise value and the threshold determines a knock intensity, which is used to reduce spark. A mean average deviation (MAD) is calculated based on the difference between the average and the instantaneous noise values. The updated MAD values are used to calculate the knock threshold for the subsequent combustion event for the cylinder.

The knock threshold defines a boundary between acceptable noise (no knock) and unacceptable noise (knock). The filtered instantaneous noise (INST) value is used to vary the gain of a band pass filter (BPF). The gain is used to increase or attenuate knock depending on the value of background noise.

An exemplary method for controlling spark knock is shown in FIG. 1. Spark knock control 10 begins with step 12. In step 14, control determines if the engine is operating. If the engine is operating, control measures an instantaneous noise in step 16. If the engine is not operating, control ends in step 52. In step 16, an instantaneous noise value is measured. In step 18, control determines if knock is present. If knock is present, a current average for knock is updated in step 22. If knock is not present, a current average for no knock is updated in step 20. The average calculations are represented by the following exemplary formulas:

For no knock:

$$AVE_{current} = AVE_{prior} + [(INST - AVE_{prior})(FC)]$$

For knock:

$$AVE_{current} = AVE_{prior} + [(INST - AVE_{prior})(FC)(KM)]$$

where FC is a detection filter coefficient and (KM) is a knock multiplier. The (KM) is applied to minimize the effect of a large instantaneous value.

If no knock is detected, control determines if the instantaneous noise value is less than the average noise value in step 24. If the instantaneous noise value is less than the average noise value, a new MAD value is calculated in step 26. An exemplary MAD calculation is represented by the following exemplary formula:

$$MAD = MAD_{PREV}(1 - Filt\ Coeff) + (AVE_{current} - INST)(Filt\ Coeff)$$

MAD is calculated using a first order lag filter. A new threshold is determined in step 28. An exemplary threshold is represented by the following formula:

$$TH = AVE_{current} + (MAD_{current})(MAD_{mult})$$

where $MAD_{mult}$ is a MAD multiplier. The MAD multiplier is a function of engine speed and load. In step 30, control determines if knock is present. If knock is present, a current knock gain average is updated in step 36. If knock is not present, a current no knock gain average is updated in step 32. The gain average calculations are represented by the following exemplary formulae:

For no knock:

$$GAINAVG_{current} = GAINAVG_{prior} + [(INST - GAINAVG_{prior})(FC_{gain})]$$

For knock:

$$GAINAVG_{current} = GAINAVG_{prior} + [(INST - GAINAVG_{prior})(FC_{gain})(KM_{gain})]$$

where $FC_{gain}$ is a gain average filter coefficient and ($KM_{gain}$) is a gain average knock multiplier.

In step 40 control determines if $GAINAVG_{current}$ is greater than a maximum GAINAVG threshold. If $GAINAVG_{current}$ is greater than the maximum GAINAVG threshold, the knock signal gain is decreased in step 48 and control returns in step 50. If $GAINAVG_{current}$ is not greater than a maximum GAINAVG threshold, control determines if $GAINAVG_{current}$ is less than a minimum GAINAVG threshold in step 44. If $GAINAVG_{current}$ is less than a minimum GAINAVG threshold, the knock signal gain is increased in step 46 and control ends in step 50. If $GAINAVG_{current}$ is not less than a minimum GAINAVG threshold, control returns in step 50. The equations set forth with respect to $AVE_{current}$, $MAD_{current}$, and $GAINAVG_{current}$ are hereinafter collectively referred to as "the knock equations". The knock equations are updated for each firing event in each cylinder.

Performing knock detection on a DOD engine presents potential drawbacks. When cylinders are deactivated, the running cylinders operate at a higher load, which increases the combustion noise of the running cylinders. While the deactivated cylinders contribute no spark knock noise, background and mechanical noise is detected from the knock sensors that are associated with the deactivated cylinders. The measured noise reduces the average value of the deactivated cylinders. When the deactivated cylinders are reactivated, the threshold is artificially low based on the reduced average value. Acceptable noise may be incorrectly characterized as spark knock, resulting in false retard.

SUMMARY OF THE INVENTION

A method according to the invention minimizes false spark knock detection for a displacement on demand engine having activated and deactivated modes. The engine is operated in the activated mode. Knock detection is performed on all cylinders of the engine during the activated mode. The engine is operated in the deactivated mode. Knock detection is performed on activated cylinders during the deactivated mode. Knock detection is disabled for deactivated cylinders during the deactivated mode.

A method according to the invention minimizes false spark knock detection for a displacement on demand engine having activated and deactivated modes. The engine is operated in the activated mode. A knock threshold is established. Knock detection is performed on all cylinders of the engine during the activated mode using the knock threshold. The engine is operated in the deactivated mode. The knock threshold is increased for the transition period. Knock detection is performed on all cylinders of the engine during the deactivated mode using the increased knock threshold.

A method according to the invention minimizes false spark knock detection for a displacement on demand engine having activated and deactivated modes. A noise value is measured in each cylinder of the engine. A threshold knock value is established based on the measured noise value for each cylinder of the engine. One or more cylinders are deactivated. The noise in the deactivated cylinders is frozen and ignored. The deactivated cylinders are reactivated. The threshold knock value is updated for the deactivated cylinders based on the measured noise values from activated cylinders. Knock is determined for the reactivated cylinders based on the updated threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
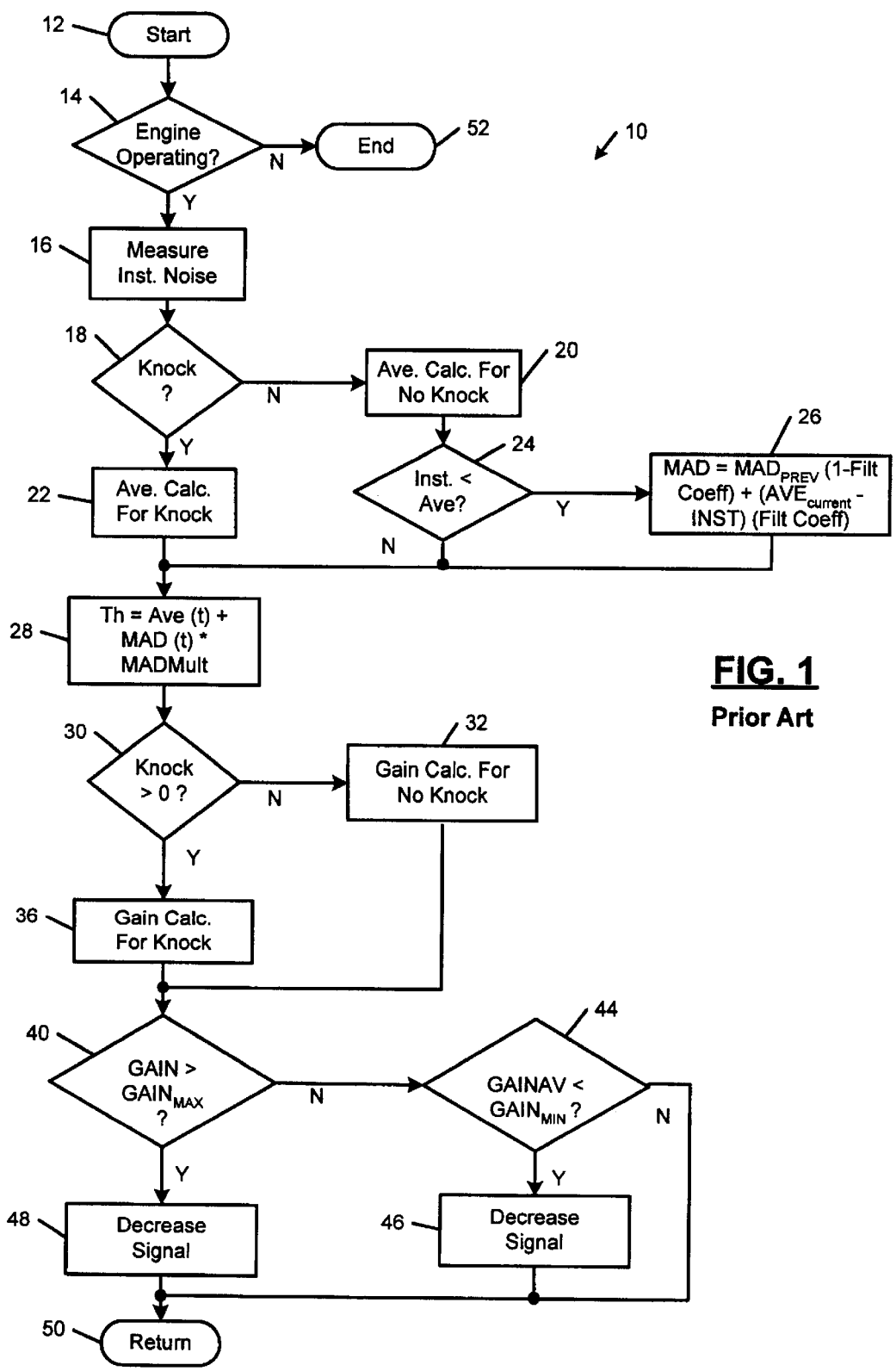
FIG. 1 is a flowchart illustrating prior art steps of performing knock detection.

The following description of the preferred embodiment(s) is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). The present invention applies to engines having various cylinder configurations such as 4, 6, 8, 10, 12 and 16 cylinders.

Figure 2:
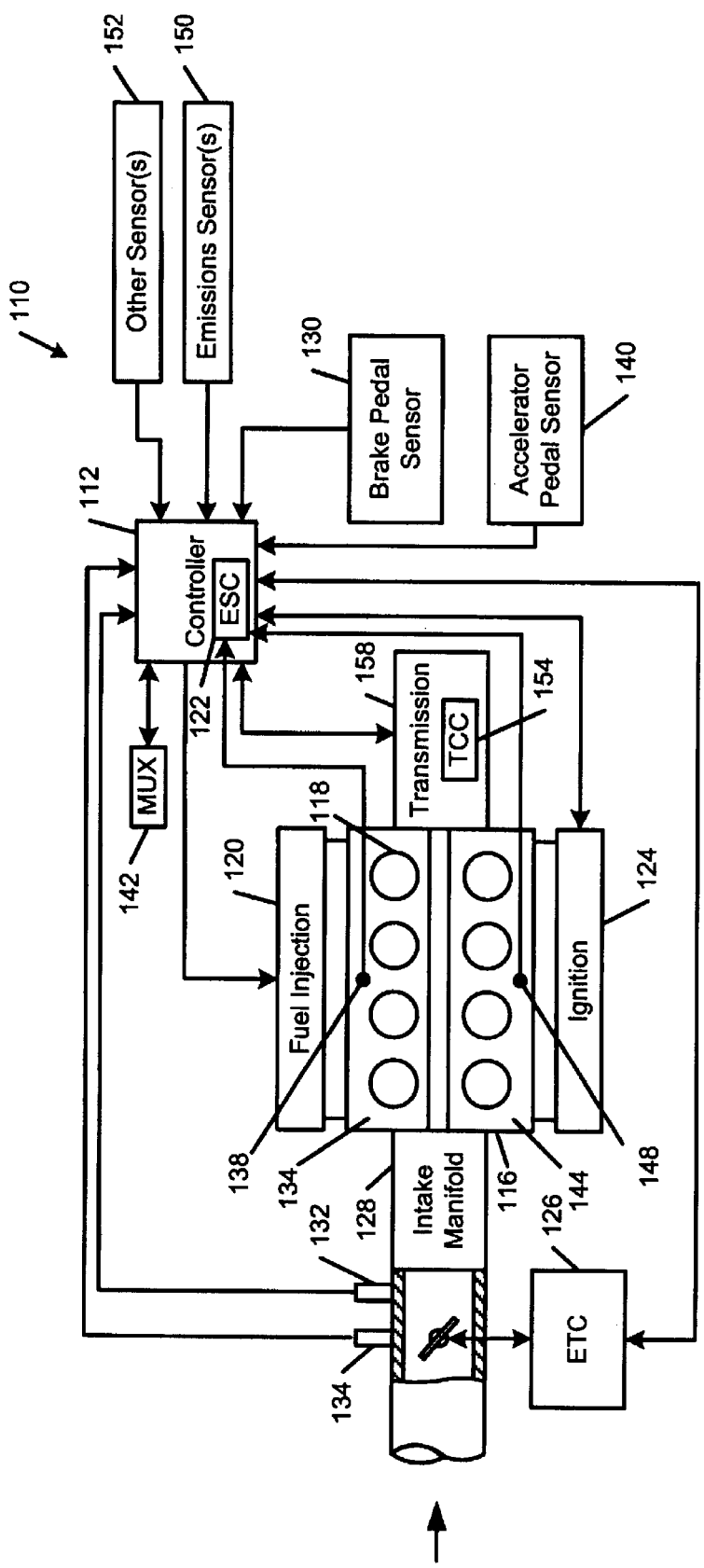
FIG. 2 is a functional block diagram of an engine control system that minimizes false spark knock detection for DOD engines according to the present invention.

Referring now to FIG. 2, an engine control system 110 according to the present invention includes a controller 112 and an engine 116. The engine 116 includes a plurality of cylinders 118 each with one or more intake valves and/or exhaust valves (not shown). The engine 116 further includes a fuel injection system 120 and an ignition system 124. An electronic throttle controller (ETC) 26 adjusts a throttle area of an intake manifold 28 based upon a position of an accelerator pedal (not shown) and a throttle control algorithm that is executed by the controller 112. One or more sensors 134 and 132 such as a manifold pressure sensor and/or a manifold air temperature sensor sense pressure and/or air temperature in the intake manifold 128. The controller 112 receives pedal position information from brake and accelerator pedal position sensors 130 and 140. An output of the engine 116 is coupled by a torque converter clutch 154 to a transmission 158.

An Electronic Spark Control (ESC) system 122 communicates with the knock sensors 138 and 148 located adjacent to the banks 134 and 144 of the engine 116. While the ESC system 122 is shown within the controller 112, it will be appreciated that the ESC system 122 and the controller 112 may include one or more controllers. In addition, while the knock sensors 138 and 148 are associated with the cylinder banks 134 and 144, respectively, it will be appreciated that alternative configurations may be used. For example, one knock sensor for each cylinder may be used or alternatively one sensor for the whole engine.

The controller 112 determines the cylinder 118 that is currently being fired. A multiplexer (MUX) 142 communicates with the controller 112 and determines the knock sensor 138 or 148 output that should be used for the current fired cylinder. For example, if a first cylinder 118 is fired in the bank 134, the MUX 142 uses an instantaneous noise value reading from the knock sensor 138. During deactivation, the ESC system 122 disregards the signal from the deactivated cylinders and performs calculations on the cylinders that are fired.

During normal engine operation, the ESC system 122 receives information based on noise detected at the knock sensors 138 and 148. The ESC 122 uses the information to control the spark knock by varying spark advance. In general, spark knock is declared when an instantaneous noise value (INST) exceeds a threshold (TH) value. This may be characterized by the following exemplary formula.

$$\text{Knock} = (INST) - (TH)$$

As a result, if a knock value is greater than 0, then the knock value is used to calculate the amount of spark retard that is needed to suppress the knock in that cylinder. In one embodiment, the spark retard is proportional to the knock value.

Figure 3:
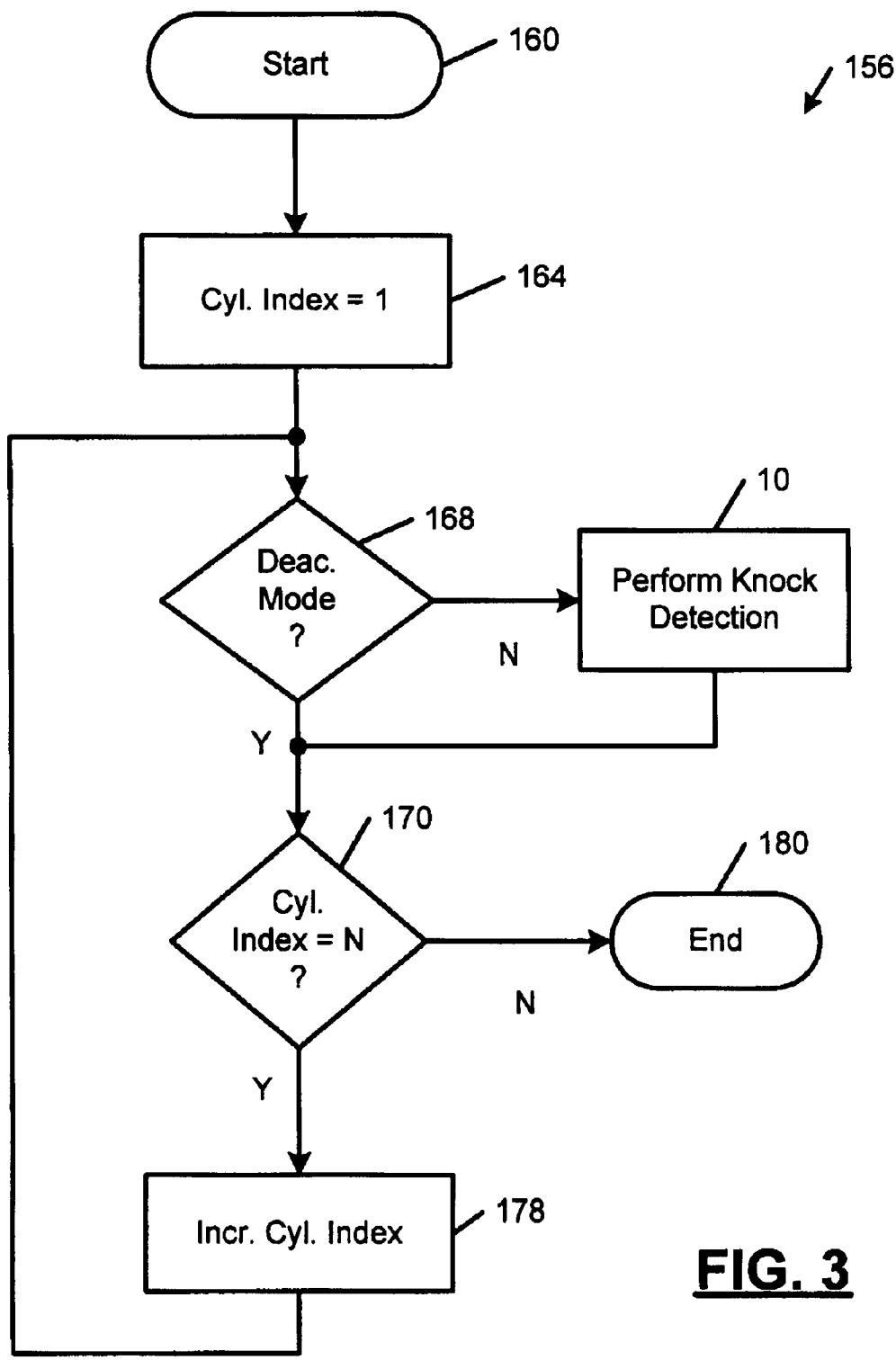
FIG. 3 is a flowchart illustrating steps for minimizing false spark knock detection during cylinder deactivation for a DOD engine according to a first method of the present invention.

With reference now to FIG. 3, steps for detecting spark for a DOD engine according to a first method are shown generally at 156. In the first method, knock detection is performed for activated but not deactivated cylinders. Control begins in step 160. In step 164, control sets a current cylinder index equal to 1. In step 168, control determines if the cylinder identified by the cylinder index is in deactivated mode. If the identified cylinder is in deactivated mode, control determines if the cylinder index is equal to the number of cylinders (N) in the engine 16 in step 170. If the identified cylinder is not in deactivated mode, control performs knock detection in step 10 (FIG. 1). If the cylinder index is equal to the number of cylinders (N) in the engine 116, control ends in step 180. If the cylinder index is not equal to the number of cylinders in the engine 116, the cylinder index is incremented by one in step 178 and control loops back to step 168.

Figure 4:
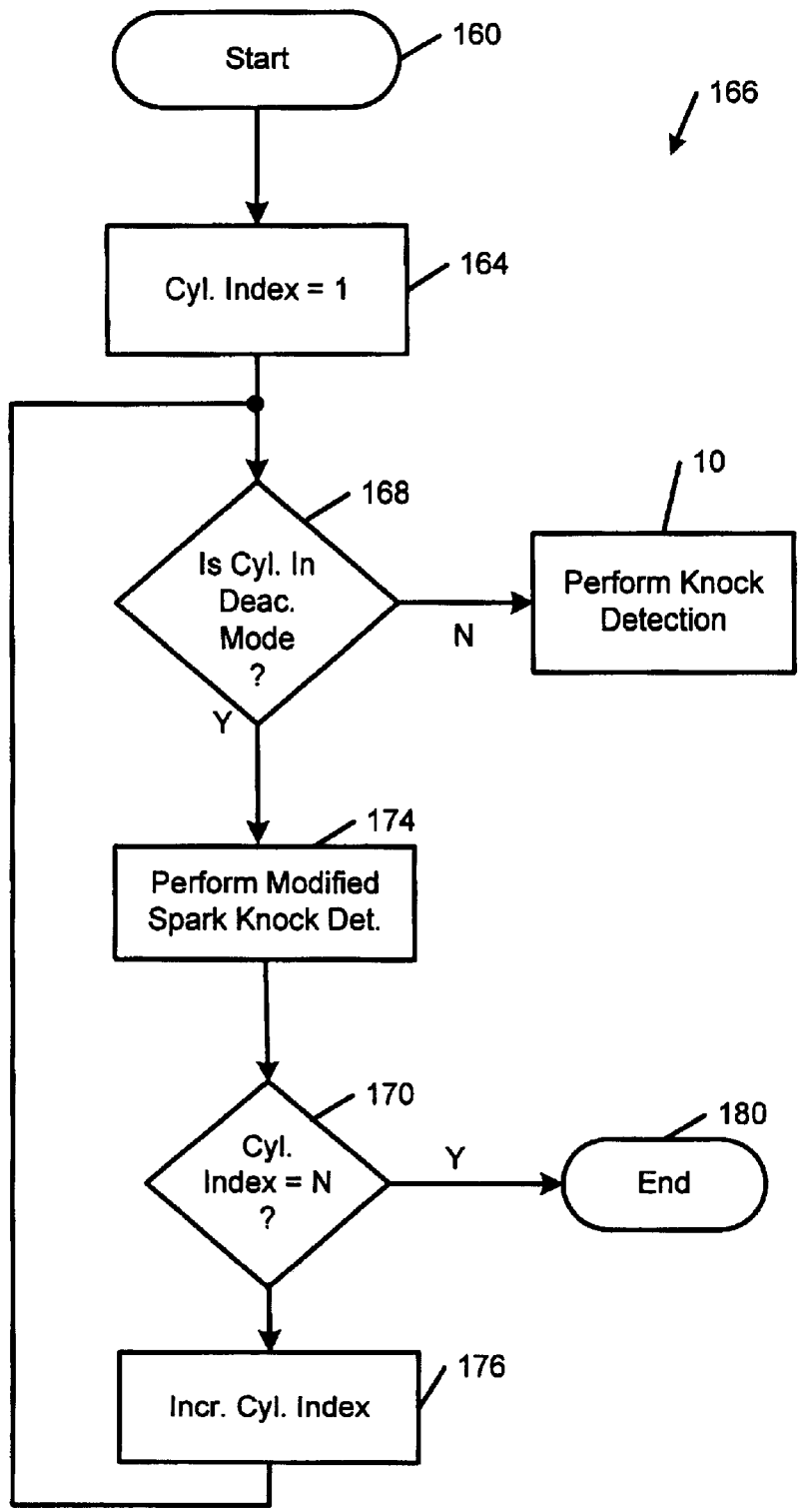
FIG. 4 is a flowchart illustrating steps for minimizing false spark knock detection during cylinder deactivation for a DOD engine according to a second method of the present invention.

Turning now to FIG. 4, steps for detecting spark for a DOD engine according to a second method are shown generally at 166. The spark detecting method 166 includes similar steps as described with respect to spark detection method 156. In the second method, a modified spark knock detection is performed for deactivated cylinders in step 174.

Figure 5:
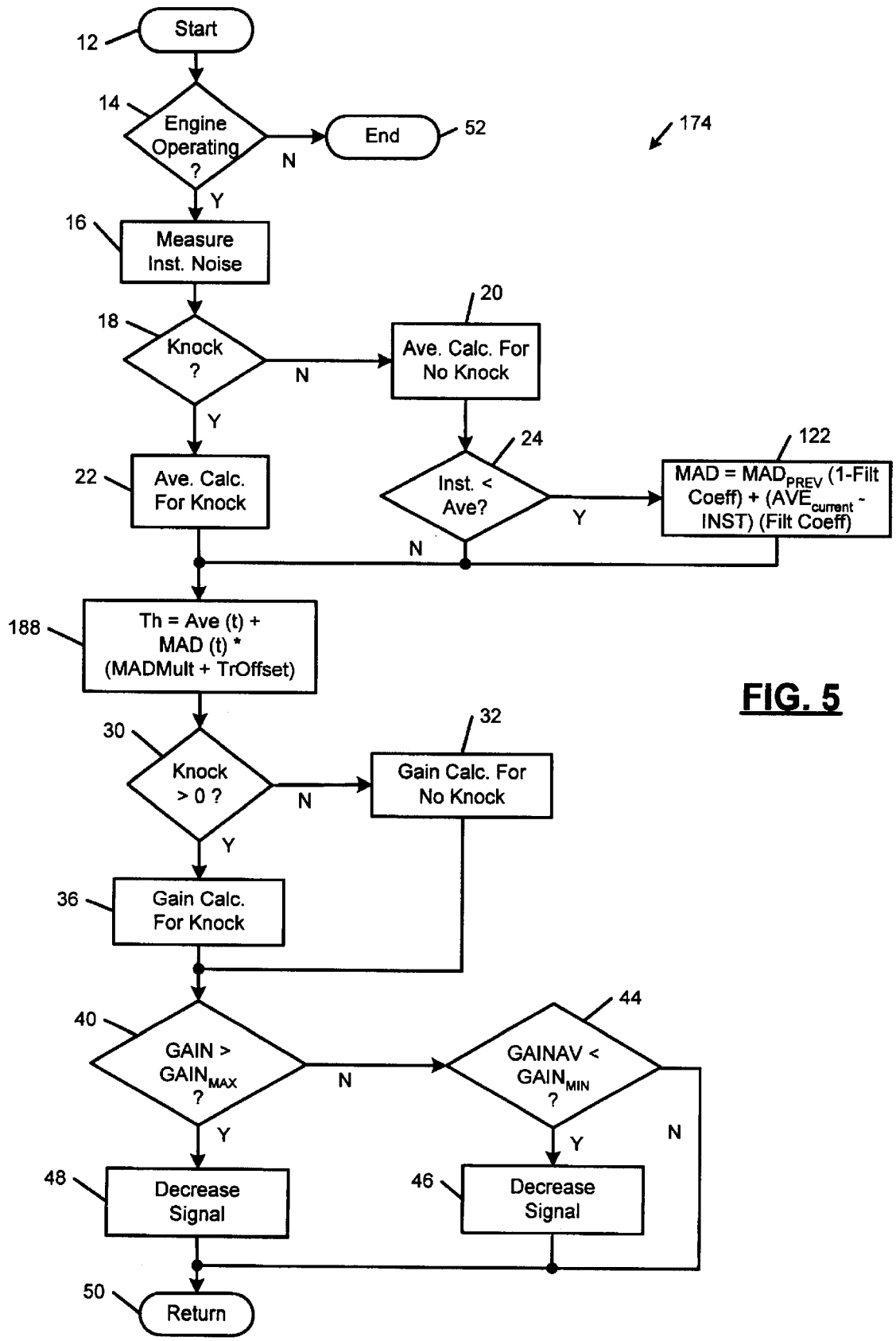
FIG. 5 is a flowchart illustrating steps of performing the modified spark knock detection of FIG. 4.

The modified spark knock detection 174 is shown in FIG. 5 and includes similar steps as knock detection 10 in FIG. 1. However, in step 188, a modified knock threshold is established to raise the threshold. The modified knock threshold may be characterized by the following formula;

$$TH_{raised} = AVE_{current} + (MAD_{current})(MAD_{mult} + \text{TransOffset})$$

where TransOffset is a transient offset and a function of engine RPM.

Figure 6:
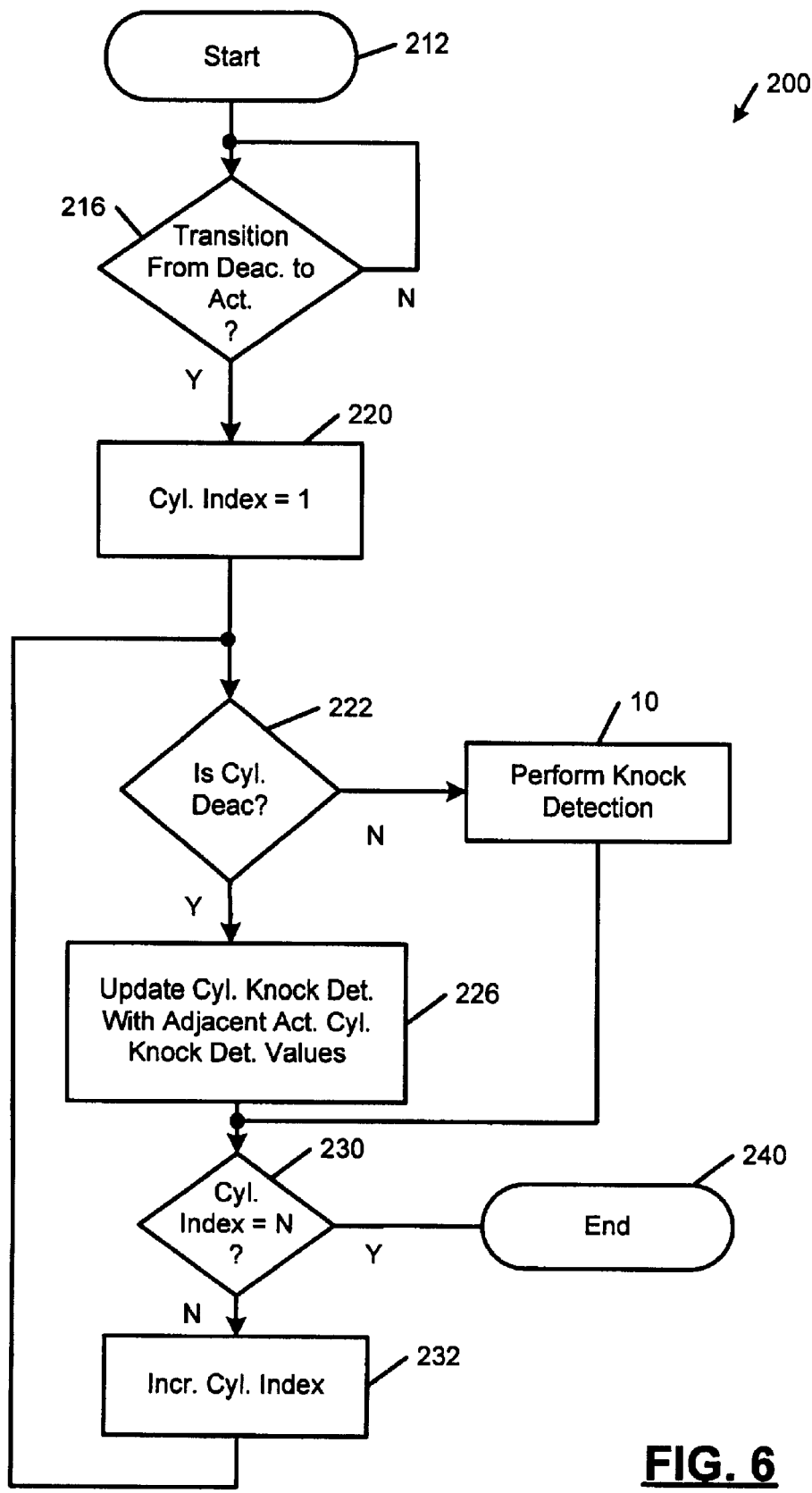
FIG. 6 is a flowchart illustrating steps for minimizing false spark knock detection during cylinder deactivation for a DOD engine according to a third method of the present invention.

With reference now to FIG. 6, steps for detecting spark for a DOD engine according to a third method are shown generally at 200. In the third spark detection method 200, the knock equations for each deactivated cylinder are updated using values from adjacent activated cylinders when transitioning from deactivated to activated mode. Spark detection begins in step 212. In step 216, control determines if the engine 116 is transitioning from deactivated mode to activated mode. In step 220, a cylinder index is set equal to 1. If the engine 116 is not transitioning to activated mode, control loops to step 216. If the engine 116 is transitioning to activated mode, control determines if the cylinder identified by the cylinder index is a deactivated cylinder in step 222. If the identified cylinder is not a deactivated cylinder, knock detection is performed in step 10 (FIG. 1). If the identified cylinder is a deactivated cylinder, the knock equations are updated with adjacent activated cylinder knock detection values in step 226.

In step 230, control determines if the cylinder index is equal to the number of cylinders (N) in the engine 116. If the cylinder index is equal to the number of cylinders (N) in the engine 116, control ends in step 240. If the cylinder index is not equal to the number of cylinders in the engine 116, the cylinder index is incremented by 1 in step 232 and control loops back to step 222.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for minimizing false spark knock detection for a displacement on demand engine having activated and deactivated modes, comprising:
   operating said engine in said activated mode;
   performing knock detection on all cylinders of said engine during said activated mode;
   operating said engine in said deactivated mode;
   performing knock detection on activated cylinders during said deactivated mode; and
   disabling knock detection for deactivated cylinders during said deactivated mode.

2. A method for minimizing false spark knock detection for a displacement on demand engine having activated and deactivated modes, the method comprising:
   operating said engine in said activated mode;
   establishing a knock threshold;
   performing knock detection on all cylinders of said engine during said activated mode using said knock threshold;
   operating said engine in said deactivated mode;
   increasing said knock threshold; and
   performing knock detection on all cylinders of said engine during said deactivated mode using said increased knock threshold.

3. The method of claim 2 further comprising measuring an instantaneous noise value.

4. The method of claim 3 further comprising calculating a current average detected noise value.

5. The method of claim 4 further comprising calculating a current mean average deviation.

6. The method of claim 5 wherein said knock threshold is based on a sum of said average detected noise value and a product of said current mean average deviation and a constant.

7. The method of claim 5 wherein said raised threshold is the sum of said average detected noise value and the product of the sum of a constant and an offset and said current mean average deviation wherein said offset is a function of speed of said engine.

8. The method of claim 5 wherein said current mean average deviation is the difference of said average detected noise value and said instantaneous noise value.

9. The method of claim 4 wherein said average noise value is the product of the sum of a prior average detected noise value and the difference of said instantaneous noise value and said prior average detected noise value and a filter coefficient.

10. A method for minimizing false spark knock detection for a displacement on demand engine having activated and deactivated modes, the method comprising:
    measuring a noise value in each cylinder of said engine;
    establishing a threshold knock value based on said measured noise value for each cylinder of said engine;
    deactivating one or more cylinders;
    updating said threshold knock value for said deactivated cylinders based on said measured noise values from activated cylinders;
    reactivating said deactivated cylinders; and
    determining knock for said reactivated cylinders based on said updated threshold.

11. The method of claim 10 further comprising measuring an instantaneous noise value.

12. The method of claim 11 further comprising calculating a current average detected noise value.

13. The method of claim 12 further comprising calculating a current mean average deviation.

14. The method of claim 12 wherein said current average detected noise value is the sum of a prior average noise value and the difference of said instantaneous noise value and said prior average noise value multiplied by a filter coefficient.

15. The method of claim 14 wherein said threshold knock value is the sum of said current average detected noise and the product of said current mean average deactivation and a constant.

* * * * *